United States Patent Office 2,794,471
Patented June 4, 1957

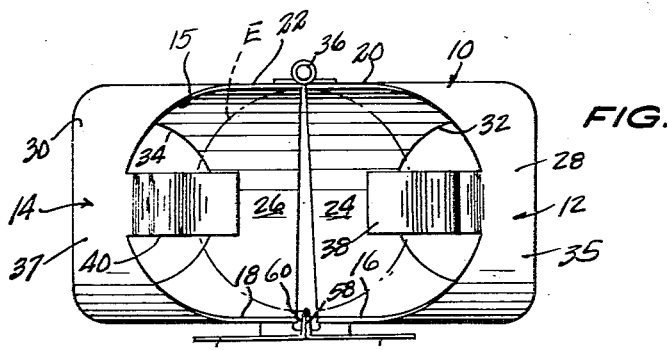

2,794,471
EGG BREAKER

Henry A. Brackman and Olive J. Brackman, Manitou Beach, Mich.

Application December 30, 1955, Serial No. 556,574

3 Claims. (Cl. 146—2)

This invention relates to egg breaking devices, and more particularly has reference to a device of this nature adapted to first cut the shell of the egg in a manner to break the shell into approximately equal halves, and then separate said halves while providing at the same time an outlet for the contents of the shell.

Among important objects of the invention are the following:

First, to provide a particularly simple device of this type that can be manufactured at a relatively low cost;

Second, to facilitate the insertion of the egg in proper position to be broken and insure the retention of the egg in said position;

Third, to provide a device as stated that can be readily cleaned so as to be kept in a sanitary condition with minimum difficulty;

Fourth, to provide an egg breaking device that will be efficiently usable in breaking eggs of various sizes; and Fifth, to form the device in such a manner as to particularly facilitate the cutting of the shell and the spreading of the shell portions to permit flow of the yoke and egg white therefrom.

Summarized briefly, the invention comprises a pair of opposed jaws having a spring hinge connection normally biasing the same to a closed position. The jaws include clamp elements adapted to grip the egg in position to be broken, and at the side of the jaws remote from the hinge connection, side by side knives are mounted. These are tensioned to normally shift out of the egg-receiving space of the device, but may be urged into said space in the closed position of the jaws to cut the shell. When, following the separation of the shell into substantially equal halves the jaws are separated, the knives are disposed as abutments holding the shells in position against the clamp elements to permit flow of the yoke and egg white therefrom.

Other objects will appear from the following description the claims appended thereto, and from the annexed drawing, in which like reference characters designate lik parts throughout the several views, and wherein:

Figure 1 is a top plan view of our egg breaking device with the jaws in closed position;

Figure 2 is a side elevational view;

Figure 3 is an end elevational view of the device as see from the right of Figure 2;

Figure 4 is a transverse sectional view on line 4—4 of Figure 2; and

Figure 5 is a top plan view showing the device in use with the jaws opened.

The egg breaker 10 constituting the present invention includes a pair of opposed jaws 12, 14 of generally tubular formation, having openings formed in their inner and outer ends and having their top walls cut away to provide an entrance opening 15 for an egg E to be broken. The tubular body portions of the jaws include side walls 16, 18 extending along the front of the device, side walls 20, 22 extending along the back of the device, bottom walls 24, 26 and top walls 28, 30. The openings in the outer ends of the jaws have been designated at 32, 34 and in a commercial embodiment, these openings might be omitted, since the jaws could be closed at their outer ends without detracting from the efficiency of operation.

A spring hinge 36 connects the side walls 20, 22 at the abutting inner ends thereof, so that the jaws may swing between the closed and open positions thereof shown in Figures 1 and 5 respectively about an axis extending transversely of the device at one side thereof.

A pair of clamp elements is provided in the device, the respective elements being connected to the body portions of the jaws, which body portions have been designated at 35, 37 respectively. The clamp elements are of identical though opposite formation, each being formed of a single length of leaf spring material.

The lengths of material used in forming the clamp elements are shaped with upwardly diverging handles 38, 40 of inverted U-shape intermediate the ends of the said lengths, and said handles at the outer sides thereof merge into U-shaped, springable connecting portions 42, 44 rigidly connected to the top walls 28, 30 respectively.

At their inner sides, handles 38, 40 merge into elongated arcuate clamping portions 46, 48 respectively, these being bowed oppositely so as to engage diametrically opposite portions of an inserted egg E.

It will be seen that this provides, when the jaws are closed, a centrally disposed egg-receiving space in which the egg may be swiftly inserted, to be held by the clamp elements in position to be cut by knives 50, 52.

The knives are formed from flat lengths of slightly springable material, said knives having at one end widened portions 50, 52 normally spaced outwardly from the adjacent sides of the respective body portions by reason of the inherent spring tension of U-shaped connecting members 54, 56 respectively anchored to the side walls 16, 18.

Along their inner side edges, the knives have inwardly directed blades 58, 60 and as shown in Figure 4, said blades intermediate their ends are formed with a series of teeth 62 of different heights. Thus, in a typical embodiment three teeth may be used in each series with the middle tooth being higher than the remaining teeth so as to penetrate the shell first and start the cut.

The springable mounting of the knives is such as to dispose the blades, normally, out of the egg-receiving space as shown in Figure 1. The blades, in this connection, are in side-by-side contacting relation in the closed position of the jaws (see Figure 1) so that they cooperate to make a single cut in the shell longitudinally of one side of the shell.

In use, one grasps the device with the opening 15 facing upwardly, and inserts the egg E through said opening. The clamp elements spread against the inherent spring tension thereof to permit insertion of the egg and then return to an egg gripping position.

Thereafter, with the fingers of both hands disposed against the back walls 20, 22 of the jaws, one places the thumbs of the hands upon the depressible portions 50, 52 of the knives and shifts the knives inwardly against the springiness of the connecting portions 54, 56.

This cuts the shell of the egg longitudinally thereof, and as a next step one swings the jaws apart against the restraint of the spring hinge, with the blades still disposed in their inner or cutting positions by reason the continuing pressure of the thumbs thereagainst.

When the jaws are opened in this manner, the blades will be disposed as abutments bearing against the opposite halves of the egg, and as a result, on movement of the jaws apart the halves will be pulled away from one another, separating the same from one another completely. At the same time, the spreading of the jaws opens the egg breaker at one side thereof, and this permits flow of the egg white and yolk out of the shell. During said flow the shell portions are held in position against the clamp elements by the blades 58, 60 in the manner shown in Figure 5.

It will be understood that when the jaws are spread, the device would be turned approximately 90 degrees so as to dispose the knives at the underside thereof, whereby to permit the downward flow of shell contents.

The jaw shapes could be varied, as well as the materials employed in the construction, it being considered that one might, for example, mount the knives differently from the manner shown and might also provide a different type of hinge connection between the jaws. In every instance, of course, the basic structural and functional characteristics will remain the same as shown in the drawings and described herein.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. An egg breaker comprising a pair of opposed jaws hollowly formed to define therebetween a space within which an egg may be broken, said jaws being hingedly connected at one side thereof for relative swinging movement between open and closed positions respectively, and including top walls oppositely recessed to define in the closed position of the jaws an entrance opening proportioned for insertion of an egg therethrough into said space while the jaws are closed, leaf spring clamp elements mounted on the respective jaws, said elements including oppositely bowed clamp portions in said space tensioned to grip the inserted egg, and handles extending upwardly in diverging relation through the entrance opening on the respective clamping portions and normally spaced apart in the closed position of the jaws a distance such that they will be cammingly biased outwardly from each other by an egg inserted therebetween through the entrance opening, so as to spread the clamping portions against the restraint of the inherent spring tension thereof to receive the egg; and knives mounted on the other sides of the respective jaws for movement into said space for breaking the inserted egg.

2. An egg breaker comprising a pair of opposed jaws hollowly formed to define therebetween a space within which an egg may be broken, said jaws being hingedly connected at one side thereof for relative swinging movement between open and closed positions respectively, and including top walls oppositely recessed to define in the closed position of the jaws an entrance opening proportioned for insertion of an egg therethrough into said space while the jaws are closed; leaf spring clamp elements mounted on the respective jaws, said elements including oppositely bowed clamp portions in said space shaped to extend longitudinally of the egg in longitudinally contacting relation with diametrically opposite portions of the egg and tensioned to grip the inserted egg, and handles integral with and extending upwardly in diverging relation from the clamp portions through the entrance opening, said handles being normally spaced apart in the closed position of the jaws a distance such that they will be cammingly biased outwardly from each other by an egg inserted therebetween through the entrance opening so as to spread the clamp portions against the restraint of the inherent spring tension thereof to receive the egg; and knives mounted on the other sides of the respective jaws for movement into said space for breaking the inserted egg.

3. An egg breaker comprising a pair of opposed jaws hollowly formed to define therebetween a space within which an egg may be broken, said jaws being hingedly connected at one side thereof for relative swinging movement between open and closed positions respectively, and including top walls oppositely recessed to define in the closed position of the jaws an entrance opening proportioned for insertion of an egg therethrough into said space while the jaws are closed, said jaws including bottom walls; leaf spring clamp elements mounted on the respective jaws, said elements including oppositely bowed clamp portions in said space connected at one end to the respective bottom walls and shaped to extend longitudinally of the egg in longitudinally contacting relation with diametrically opposite portions of the egg, handles integral with the other ends of the clamping portions and extending upwardly in diverging relation from the clamping portions through the entrance opening, said handles being normally spaced apart, in the closed position of the jaws, a distance such that they will be cammingly biased outwardly from each other by an egg inserted therebetween through the entrance opening so as to spread the clamping portions against the restraint of the inherent spring tension thereof to receive the egg, and U-shaped connecting portions connected between the divergent ends of the handles and the respective top walls, said connecting portions being spring tensioned to bias the clamping portions toward each other into positions clampably engaging the egg therebetween; and knives mounted on the other sides of the respective jaws for movement into said space for breaking the inserted egg.

References Cited in the file of this patent
UNITED STATES PATENTS

| | | |
|---|---|---|
| 207,426 | Krey | Aug. 27, 1878 |
| 782,039 | Merrifield et al. | Feb. 7, 1905 |
| 2,464,307 | Griffin et al. | Mar. 15, 1949 |

FOREIGN PATENTS

| | | |
|---|---|---|
| 242,886 | Great Britain | Nov. 19, 1925 |